March 31, 1959   W. G. CANFIELD   2,879,601
INSTRUMENT FOR AND METHOD OF MEASURING AND
OBTAINING AVERAGES OF MEASUREMENTS
Filed Nov. 16, 1956   2 Sheets-Sheet 1
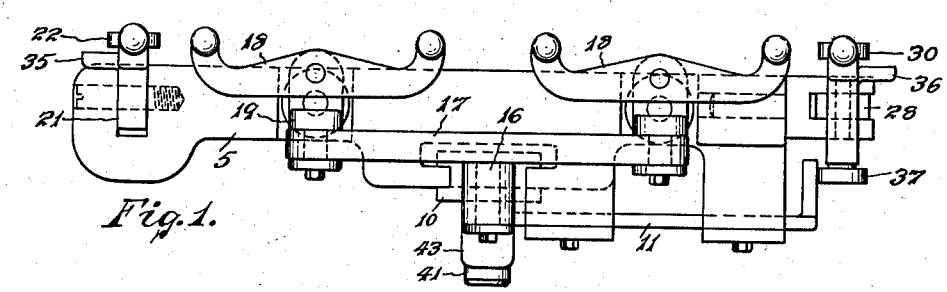
Fig. 1.
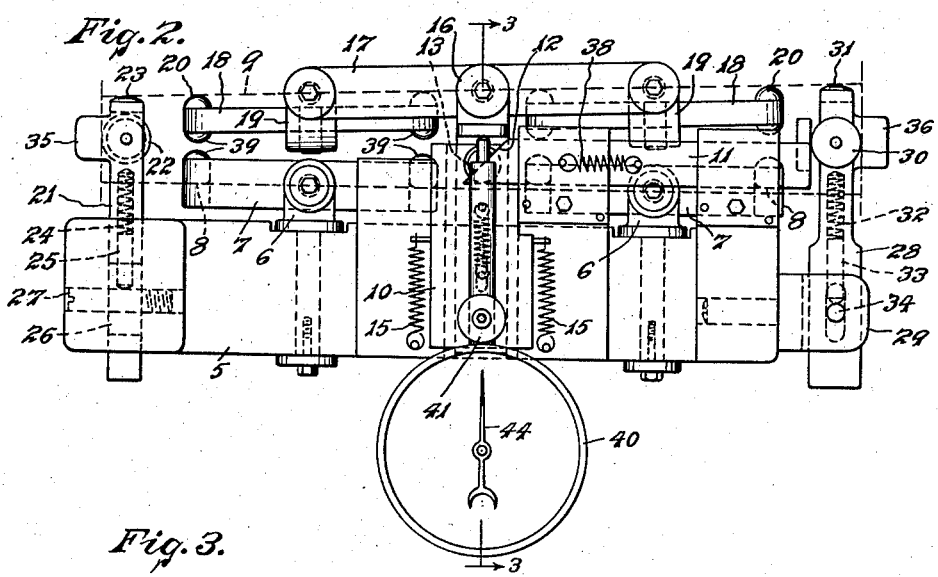
Fig. 2.
Fig. 3.
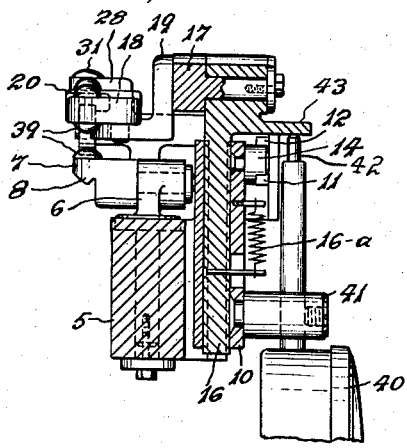
Fig. 4.
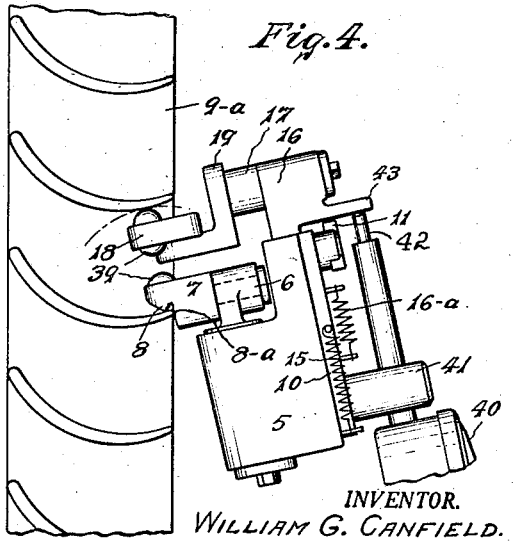
Fig. 7.
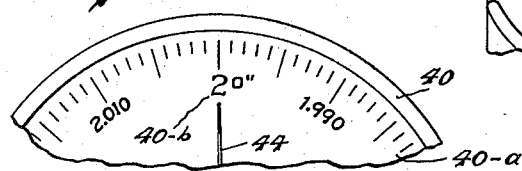
INVENTOR.
WILLIAM G. CANFIELD.
BY
Louis V. Lucia
ATTORNEY.

March 31, 1959 W. G. CANFIELD 2,879,601
INSTRUMENT FOR AND METHOD OF MEASURING AND
OBTAINING AVERAGES OF MEASUREMENTS
Filed Nov. 16, 1956 2 Sheets-Sheet 2

INVENTOR.
WILLIAM G. CANFIELD.
BY
Louis V. Lucia
ATTORNEY.

United States Patent Office

2,879,601
Patented Mar. 31, 1959

2,879,601

INSTRUMENT FOR AND METHOD OF MEASURING AND OBTAINING AVERAGES OF MEASUREMENTS

William G. Canfield, Plainville, Conn., assignor of one-half to Frank J. Lipski, Detroit, Mich.

Application November 16, 1956, Serial No. 622,708

11 Claims. (Cl. 33—147)

This invention relates to an instrument for and method of measuring and obtaining averages of measurements and more particularly to a method of averaging the measurements of flow spaces such as the air flow spaces between the vanes of a rotor for turbines and the like and particularly those used in gas turbine engines.

It is well known among those skilled in the art that the average of the measurements of flow spaces, such as those between the vanes of a turbine wheel in a turbo-jet engine, must be known accurately within very close tolerances and that, heretofore, the measuring and averaging of such measurements has had to be done by a skilled person and required a great deal of time.

As done heretofore, separate measurements have had to be taken at a plurality of different locations in each of the spaces and then separately computed by means of predetermined tables. This has required expert knowledge and skill in the measuring operation in order to provide the necessary information for computing the average of all the measurements of each space so measured.

It is an object of this invention, therefore, to provide an instrument whereby only a single measuring operation is necessary to provide a plurality of measurements for different portions of a space and, at the same time, a computation resulting in a single figure representing the actual, or total, flow area of the space measured.

A further object is the provision of a novel method for the computation of measurements.

Further objects and advantages of my invention will be more clearly understood from the following description and from the accompanying drawings in which:

Fig. 1 is a plan view of one form of a measuring and averaging instrument which may be used in the practice of the present invention.

Fig. 2 is a front view of said instrument.

Fig. 3 is a sectional side view thereof on line 3—3 of Fig. 2.

Fig. 4 is a side view of said instrument showing the manner in which it is used for measuring a space between two vanes of a turbine wheel.

Fig. 7 is an enlarged fragmentary plan view showing the form of dial which is preferably used in connection with my invention.

Figure 5:
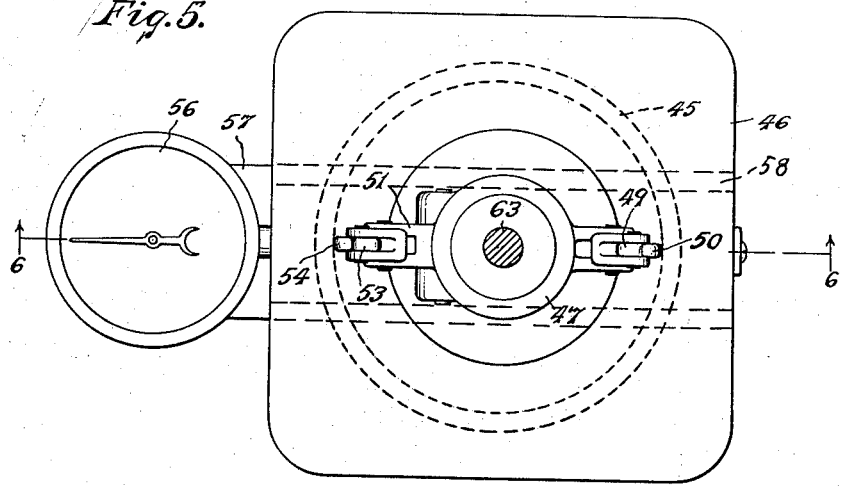
Fig. 5 is a sectional plan view, on line 5—5 of Fig. 6, of another form of an instrument which may also be used in the practice of the present invention.

The form of instrument illustrated in Figs. 1 to 4 may include a base 5 having a pair of spaced supporting members 6—6 projecting therefrom which are swivelly mounted thereon. Suitable means, not shown, are provided for limiting the swivel movement thereof as may be desired.

Upon said members, there is pivotally mounted a pair of lower feeler bars 7—7 each having spaced measuring points 8—8 thereon adapted to engage the sides of a space to be measured, such as indicated in dotted lines at 9 in Fig. 2.

The said base has slidably mounted thereon a carrier slide 10 which is actuated by a measuring bar 11 having a cam surface 12 that cooperates with a cam surface 13 on a cam stud 14 which is mounted upon said carrier slide to move said slide against the tension of biasing springs 15—15 that are anchored to the base 5.

The carrier slide 10 has slidably mounted thereon a measuring slide 16 which is biased upwardly, as shown in Fig. 2, by a spring 16-a between said slides 10 and 16 upon which there is pivotally mounted an averaging bar 17 that carries a pair of upper feeler bars 18—18 which are pivotally mounted upon bearing brackets 19—19 that are pivotally supported upon the opposite ends of the bar 17; suitable means, not shown, being provided for limiting the pivotal movement of said bars 18—18 on the brackets 19—19. The said feeler bars 18—18 are provided with measuring points 20—20 to engage a side of such as the space 9 for a measuring operation.

The base 5 is provided at one end thereof with an anchoring post 21 having a contact roller 22 thereon for engaging an end of the space 9 and a contact point 23 to engage the side surface adjacent said end so that a corner of said space may be used to locate the instrument therein for the measuring operation. The said post 21 is slidably mounted on the base 5 and has a suitable spring 24 therein which is anchored on a plunger 25 that projects into a slot 26 in said post and abuts the securing screw 27 in the base for urging the post 21 outwardly of the base and thereby forcing the base in the opposite direction and yieldingly retaining the points 8—8 in engagement with a side of the space 9.

At the opposite end of the base 5, there is provided a measuring post 28 which is pivotally mounted in a bracket 29 and has a measuring roller 30 and a contact point 31 thereon to engage the end and side of the space 9 and a spring 32 that is anchored on a plunger 33 that abuts a pivot pin 34 and urges the respective end of the base in an opposite direction to retain it in measuring position in the space 9.

The said posts 21 and 28 are provided with projections 35 and 36, respectively, to engage the surfaces adjacent the edges of the space 9 and position said posts.

The post 28 also has thereon an operating roller 37 which is in engagement with the end of the cam bar 11 to move said bar longitudinally against the force of a spring 38.

The feeler bars 7—7 and 18—18 are provided with gaging points 39 to receive a suitable gage between them when it should be desired to do so and when a predetermined dimension is specified between the points of the space contacted by said contact points of the feeler bars. There is also provided a micrometer indicator 40 which is mounted on a post 41 on the slide 10 and has an operating plunger 42 that is in contact with and actuated by a projection 43 on the slide 16.

The contact points 8 are located in corners having a wall 8-a to engage the free edge of the vane, as shown in Fig. 4, for fulcruming the instrument on said edge so that it may be rocked for a measuring operation.

When it is desired to take a measurement of a space, such as 9, in order to determine the average of the measurements thereof at a predetermined point, such as at 9-a in Fig. 4, the above described instrument is first placed in said space so that the rollers 22 and 30 and the points 23 and 31 engage with adjacent surfaces of the respective ends and side of the space 9 and the points 8—8 of the bars 7—7 are placed in contact with the opposite side adjacent the edge of said space, as clearly shown in Fig. 4. The points 20—20 are then placed in contact with the opposite side of the space 9 and the instrument is rocked upon the points 8—8 so that the points 20 are moved inwardly and outwardly against said opposite side of the space for a measuring operation. Contact of the said points 20—20 with the side of the space will cause the bars 18—18 to rock on their respective pivots and adjust themselves to the said surface and also cause corresponding adjustment of the averaging bar 17. The rocking movement of the instrument will then cause the averaging bar to move the slide 16 downwardly, as shown in Fig. 4, and thereby cause the plunger of the indicator 40 to be operated by the projection 43 on said slide 16 and rotate the indicator pointer 44.

Variations in the length of the space 9 will be compensated for by movement of the roller 30 relatively to the roller 22 which will cause the roller 37 to move the cam bar 11 endwise and thereby cause the cam surface 12 thereof to operate against the cam surface 13 on the stud 14 and move the slide 10 in accordance with the movement of the roller 30. This movement of the slide 10 will also cause bodily movement of the indicator 40 with said slide and relatively to the projection 43 so that the averaged measurements of the width of the space 9 is thereby compensated for any variations in the length of said space and the measurement indicated on the indicator 40 will be the average of the measurements translated into what is herein referred to as the total flow area of said space.

As shown in Fig. 7, a special dial 40-a is preferably provided in the indicator 40 for each size of the spaces which are to be gaged by my improved measuring instrument; the said dial having indicia 40-b denoting the specified total area of said spaces and, at each side thereof, other indicia for indicating plus or minus errors in the actual area of any of such spaces upon being measured.

Figure 6:
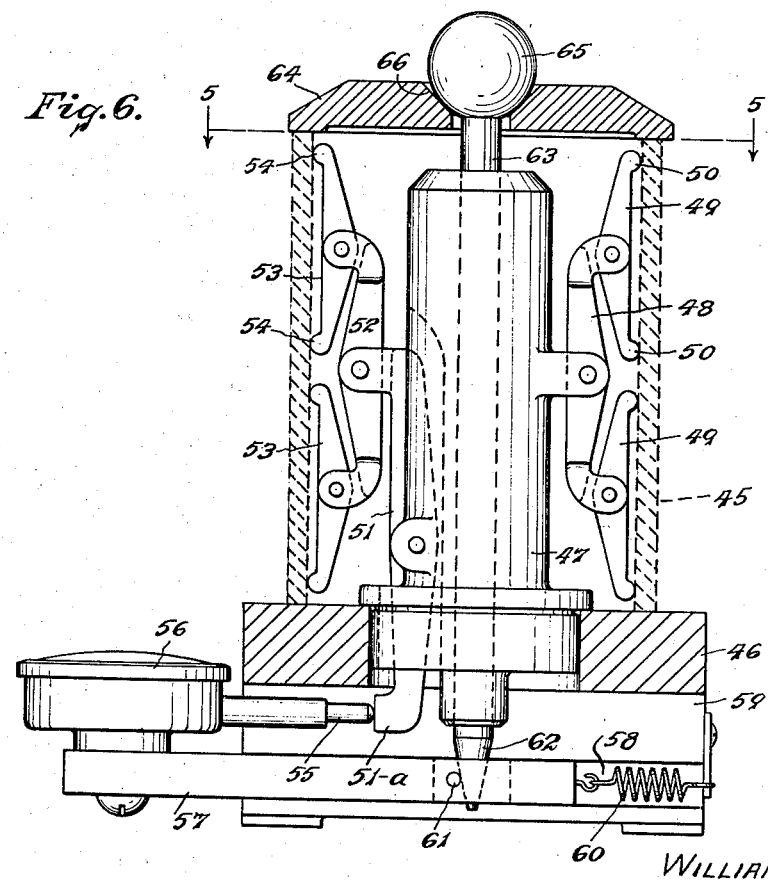
Fig. 6 is a sectional side view thereof on line 6—6 of Fig. 5.

The modified form of measuring instrument shown in Fig. 5 and 6 especially adapted for averaging the measurements to determine the volume of the inside of tubular members, such as indicated in dotted lines at 45, and may include a base 46 upon which there is mounted a vertical post 47. An averaging bar 48 is pivotally mounted upon one side of said post and carries thereon a pair of feeler bars 49—49 each having feeler points 50—50 thereon.

At the opposite side of the post 47, there is pivotally mounted a measuring lever 51 which has an averaging bar 52 that is pivotally mounted upon one end thereof and carries a pair of feeler levers 53—53 that are pivotally mounted upon the ends of the bar 52 and each of which has a pair of feeler points 54—54 at the opposite ends thereof.

The lever 51 has an operating portion 51-a which extends below the base 46 and operatively engages the spring projected plunger 55 of a micrometer indicator 56 that is mounted upon a slide 57 which is disposed under the base 46 and is slidable in slots 58 in the leg portions 59 of said base. The said slide 57 is biased by a spring 60 to urge a stop pin 61 on said slide into engagement with a tapered cam portion 62 on the end of a compensating rod 63 which is located by means of a measuring plate 64 that supports said rod by a spherical head portion 65 which rests in a centering recess 66. If desired, the said plate may be provided with a radial slot leading into the recess 66 to permit the plate to be placed in measuring position without requiring removal of the rod 63.

In measuring a tubular member, such as 45, with the said modified form of instrument, the member is first placed upon the base 46, the plate 64 is then placed upon the upper end of the member and the head 65 of the rod 63 is positioned in the recess 66 in the position shown in Fig. 6. When in this position, the spring 60 will urge the spring projected plunger 55 of the indicator into yielding engagement with the end portion 51-a of the lever 51 and also urge the stop pin 61 into engagement with the cam portion 62 of the rod 63 and thereby move the slide 57 laterally and locate the indicator 56 with respect to the portion 51-a of the lever 51 and thereby calibrate the said indicator so as to compensate the operation thereof for any variations in the length or height of the tubular member 45 being measured.

It will be understood that the force applied by the spring pressed plunger 55 against the end portion of the lever 51 will force the upper portion of said lever outwardly from the post 47 and move the feeler bars 53—53 into engagement with the inside wall of the member 45. At the same time, the said bars 53—53 will move the member 45 laterally so that the opposite side thereof will be brought into engagement with the feeler bars 49—49.

Movement of the feeler bars 49—49 and 53—53 into engagement with the opposite inner sides of the member 45 will cause the lever 51 to operate the plunger 55 of the indicator in accordance with the average of the measurements between the respective oppositely disposed feeler levers 49 and 53 and thereby cause said indicator to show, at once, on its dial a computation which, having been compensated by the cam 62, will represent the volume of the space inside the member being measured.

It will be understood, from the above description, that my invention provides a novel instrument and method for quickly and accurately measuring a space at a plurality of points and at the same time averaging the measurements and obtaining an indication which can be translated to denote the flow area of volume of a space.

I claim:

1. An instrument for measuring a space of variable dimensions, said instrument including a base, means on said base for locating the instrument within said space, a plurality of feeler members for measuring said space at a plurality of locations therein, means for averaging the measurements of said space taken by said feeler members, means for compensating the averaged measurements in accordance with variations in the length of said space, and means for indicating the compensated average of all of said measurements.

2. An instrument for measuring a space, said instrument including a base, means on said base for locating the instrument within said space and in contact with an end thereof, a plurality of feeler members having contact points for contacting the sides of said space, means for averaging the measurements of said space taken by said contact points, separate measuring means in contact with the opposite end of said space for measuring the length thereof, means for compensating the average of the measurements taken by the said feeler members in accordance with variations in the length of the space, and means for indicating the compensated average of said measurements.

3. An instrument for measuring a space, said instrument including a base, means on said base for locating the instrument within the said space, a plurality of feeler bars having contact points thereon for contacting the sides of said space, means for averaging the measurements taken by said feeler bars at points contacted by said contact points, means for measuring the length of said space, means for compensating the average measurement by the contact points in accordance with variations in the length of said space, and means for indicating the compensated average of said measurements.

4. An instrument for measuring a space, said instrument including a base, means on said base for locating the instrument within said space and in contact with an end thereof, a pivotally mounted averaging bar on said base, a plurality of feeler bars pivotally mounted on said averaging bar and having contact points for contacting the sides of said space, an indicator, means movable by said averaging bar for actuating said indicator to indicate thereon the average measurement taken by said feeler bars, separate measuring means in contact with the opposite end of the space, compensating means actuated by said separate means for moving the indicator to compensate the measurement taken by the feeler bars for variations in the length of the space measured by said separate measuring means and thereby indicating on said instrument the compensated average of said measurements.

5. An instrument for measuring a space, said instrument including a base, a plurality of feeler bars pivotally mounted on said base and having contact points thereon for engaging one side of the space to be measured, a carrier member slidable on said base, a slide member slidable on said carrier member, an averaging bar pivotally mounted on said slide member, feeler bars pivotally mounted upon the opposite ends of said averaging bar and having contact points thereon for engaging the opposite side of the space, an indicator mounted upon the carrier member and movable therewith, means upon the slide member for operating said indicator, a separate measuring member pivotally mounted upon the base and engageable with the opposite end of the space and means operable by said separate measuring member for moving the carrier member to thereby move the indicator relatively to the slide member for compensating the measurement taken by the feeler bars in accordance with variations in the length of the space and thereby causing said indicator to indicate the compensated average of said measurements.

6. An instrument for measuring the inside of a space or opening including a base, a pair of feeler bars pivotally mounted on said base and having spaced contact points thereon for contacting one side of said space, a bar projecting from said base and engageable with an end of the space to locate the instrument therein, a carrier member slidable on said base, a slide member slidable in said carrier member, an averaging bar pivotally mounted upon said slide member, a plurality of feeler bars pivotally mounted upon the ends of the averaging bar and having contact points thereon engageable with the opposite side of the space, an indicator mounted upon the carrier member and movable therewith, an abutment on the slide member engageable with a plunger on said indicator for operating the indicator to indicate thereon the average measurement taken by said contact points of the feeler bars, a separate measuring member movably mounted upon the base for measuring the length of said space, a slide bar movable by said separate measuring member, and cam means between said slide bar and the carrier member for moving the said carrier member and thereby moving the indicator relatively to the abutment on the slide member for compensating the averaged measurement for any variations in the length of the space and causing indication upon the indicator of the compensated average of said measurements.

7. An instrument for measuring a space or opening, said measuring instrument including a base, a locating bar longitudinally slidable in said base and extending therefrom, means on said locating bar engageable with one end of the space for locating the instrument therein, a pair of feeler bars pivotally mounted on said base and having contact points thereon engageable with one side of the space for fulcruming the said instrument at said side, a carrier member slidable on said base, an indicator mounted on said carrier member and movable therewith, a slide member slidable in said carrier member and extending therefrom, an averaging bar pivotally mounted upon the said slide member, a feeler bar pivotally mounted upon each end of the averaging bar and having contact points engageable with the opposite side of the space and substantially opposite the contact points fulcruming the instrument, a projection on the slide member for operating the plunger of the indicator to thereby operate the said indicator in accordance with the average of the measurements taken by the said contact points, a separate measuring bar pivotally mounted upon said base and extending therefrom, means on said separate measuring bar engageable with the opposite end of the space for measuring the length thereof, a slide bar slidable on said base and movable by said measuring bar, cam means between said slide bar and carrier member for moving the carrier member and thereby moving the indicator with respect to the projection on the slide member for compensating the averaged measurement taken by the feeler bars for any variation in the length of said space and thereby causing an indication by the said indicator denoting the compensated average of said measurements.

8. The method of measuring a space of variable dimensions which includes measuring the width of the space between different points at opposite sides thereof, averaging the measurements taken at said points and then compensating the averaged measurement in accordance with variations in the length of the space.

9. The method of measuring a space or opening which includes measuring the width of said space between a plurality of points at opposite sides thereof, averaging the measurements taken between said points, measuring the length of the space for any variations therein, and compensating the averaged measurement of the width for any variations in the length of said space and thereby rendering the compensated average of said measurements.

10. The method of measuring a space or opening, said method including measuring the width of said opening between a plurality of pairs of opposite points, averaging the measurements taken between said points, measuring the length of the opening between the ends thereof, and compensating the averaged measurements of the width for any variations in the measurement taken of the length and thereby rendering the compensated average of said measurements.

11. The method of measuring a space or opening, said method including measuring the width of said space or opening between a plurality of pairs of opposite points, averaging the measurements taken at said points, measuring the length of the space or opening between the ends thereof, and compensating the averaged measurements of the width for any variations in the length and thereby rendering the compensated average of said measurements.

References Cited in the file of this patent
UNITED STATES PATENTS

| | | |
|---|---|---|
| 2,030,244 | Cox | Feb. 11, 1936 |
| 2,638,680 | Baker | May 19, 1953 |
| 2,639,511 | Whiteman | May 26, 1953 |
| 2,719,363 | Montgomery et al. | Oct. 4, 1955 |
| 2,795,049 | Eisele | June 11, 1957 |